(12) United States Patent
Desai et al.

(10) Patent No.: US 11,907,161 B2
(45) Date of Patent: Feb. 20, 2024

(54) UPGRADING THE FILE SYSTEM OF OBJECTS IN A DISTRIBUTED STORAGE SYSTEM

(71) Applicant: VMware, Inc., Palo Alto, CA (US)

(72) Inventors: Asit Desai, Cupertino, CA (US); Abhay Kumar Jain, Cupertino, CA (US); Wenguang Wang, Santa Clara, CA (US); Eric Knauft, San Francisco, CA (US); Enning Xiang, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 321 days.

(21) Appl. No.: 17/367,233

(22) Filed: Jul. 2, 2021

(65) Prior Publication Data

US 2023/0004525 A1 Jan. 5, 2023

(51) Int. Cl.
*G06F 16/14* (2019.01)
*G06F 16/11* (2019.01)
*G06F 12/10* (2016.01)
*G06F 3/06* (2006.01)

(52) U.S. Cl.
CPC .......... *G06F 16/122* (2019.01); *G06F 3/0604* (2013.01); *G06F 3/067* (2013.01); *G06F 3/0659* (2013.01); *G06F 3/0664* (2013.01); *G06F 12/10* (2013.01); *G06F 16/148* (2019.01)

(58) Field of Classification Search
CPC ............................ G06F 16/122; G06F 16/148
See application file for complete search history.

(56) References Cited

U.S. PATENT DOCUMENTS

| | | | |
|---|---|---|---|
| 2016/0162369 A1* | 6/2016 | Ahn | G06F 11/1461 707/654 |
| 2021/0004485 A1* | 1/2021 | Summers | G06F 40/284 |
| 2021/0209077 A1* | 7/2021 | Snellman | G06F 16/219 |

* cited by examiner

*Primary Examiner* — Baoquoc N To
(74) *Attorney, Agent, or Firm* — Kim & Stewart LLP

(57) ABSTRACT

An example method of upgrading a distributed storage object from a first version to a second version includes: querying metadata of a first component configured according to the first version of the distributed storage object, the metadata defining extents of data on a disk group of the first component; populating, for a second component configured according to the second version of the distributed storage object, logical and middle maps based on the metadata such that initial entries in the logical map point to initial entries in the middle map, and the initial entries in the middle map point to physical addresses of the disk group of the first component; and reading the data from the disk group of the first component and writing the data to a disk group of the second component while updating the initial entries in the middle map.

20 Claims, 6 Drawing Sheets

UPGRADING THE FILE SYSTEM OF OBJECTS IN A DISTRIBUTED STORAGE SYSTEM

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. A virtual infrastructure administrator ("VI admin") interacts with a virtualization management server to create server clusters ("host clusters"), add/remove servers ("hosts") from host clusters, deploy/move/remove VMs on the hosts, deploy/configure networking and storage virtualized infrastructure, and the like. The virtualization management server sits on top of the server virtualization layer of the SDDC and treats host clusters as pools of compute capacity for use by applications.

A virtualized computing system can provide shared storage for applications to store their persistent data. One type of shared storage is a virtual storage area network (vSAN), which is an aggregation of local storage devices in hosts into shared storage for use by all hosts. A vSAN can be a policy-based datastore, meaning each object created therein can specify a level of replication and protection. The vSAN can then perform automatic placement decisions for replicas across the local storage devices of the hosts.

The disk groups of a vSAN, include disks with an on-disk format having a certain version and features supported by the vSAN software. When the vSAN software is upgraded, the disk groups can be upgraded to a new on-disk format. For example, an older on-disk format can have an extent-based file system, whereas a newer on-disk format can have a log-structured file system. A user may desire to object an object stored on a vSAN to use the newer on-disk format for its disk groups. One upgrade solution is to perform an offline upgrade by reading content from the previous files system and inserting the content into a new file system. Such a solution requires downtime and can be impractical. Another solution is to store only new data in the newer file system and serve old data from the previous file system. However, this solution will have a continuous cost of forwarding and maintaining two file systems for the object.

DETAILED DESCRIPTION

Figure 1:
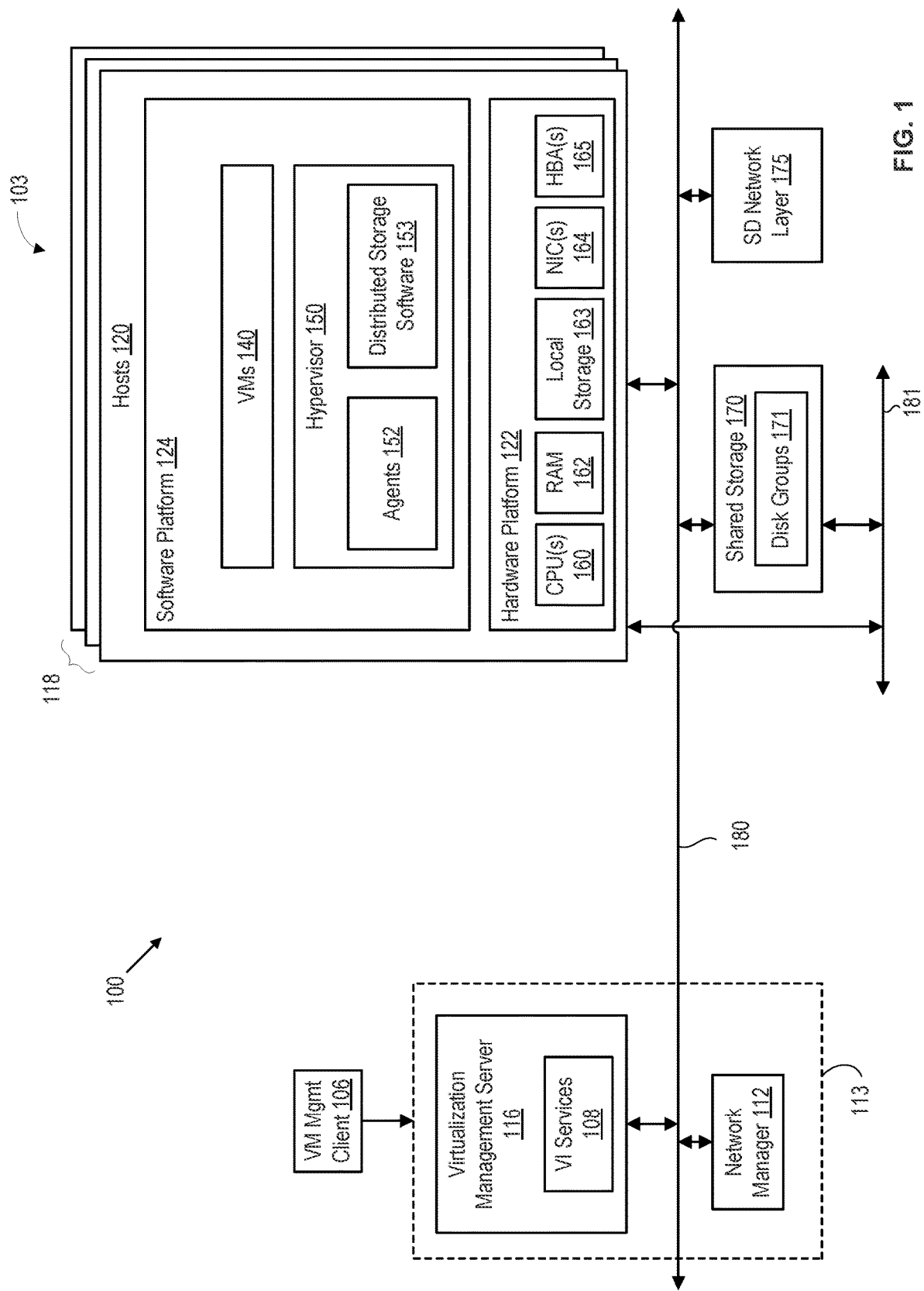
FIG. 1 is a block diagram of a virtualized computing system in which embodiments described herein may be implemented.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, one or more host bust adaptors (HBAs) 165, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein).

In the embodiment illustrated in FIG. 1, hosts 120 can access shared storage 170 by using NICs 164 to connect to network 180. In addition or alternatively, hosts 120 can access shared storage 170 using HBAs 165 connected to a separate network 181 (e.g., a fibre channel (FC) network). Shared storage 170 include one or more storage arrays, such as a storage area network (SAN), network attached storage (NAS), or the like. Shared storage 170 may comprise magnetic disks, solid-state disks (SSDs), flash memory, and the like as well as combinations thereof.

In some embodiments, hosts 120 include local storage 163 (e.g., hard disk drives, solid-state drives, etc.). Local storage 163 in each host 120 can be aggregated and provisioned as part of a virtual SAN (vSAN), which is another form of shared storage 170. Virtualization management server 116 can select which local storage devices in hosts 120 are part of a vSAN for host cluster 118. A vSAN in shared storage 170 includes disk groups 171. Each disk group 171 includes a plurality of local storage devices 163 of a host 120. Each disk group 171 can include cache tier storage (e.g., SSD storage) and capacity tier storage (e.g., SSD, magnetic disk, and the like storage). Each disk in each disk group 171 has an on-disk format supported by distributed storage software 153 in hypervisor 150, discussed below. The on-disk format supports one or more file systems, such as an extent-based file system and/or log-structured file system.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA An embodiment of software platform 124 is discussed further below with respect to FIG. 2.

Hypervisor 150 further includes distributed storage software 153 for implementing a vSAN on host cluster 118. Distributed storage systems include a plurality of distributed storage nodes. In the embodiment, each storage node is a host 120 of host cluster 118. In the vSAN, virtual storage used by VMs 140 (e.g., virtual disks) is mapped onto distributed objects ("objects"). Each object is a distributed construct comprising one or more components. Each component maps to a disk group 171. For example, an object for a virtual disk can include a plurality of components configured in a redundant array of independent disks (RAID) storage scheme. Input/output (I/O) requests by VMs 140 traverse through network 180 to reach the destination disk groups 171. In some cases, such traversal involves multiple hops in host cluster 118 and network resources (e.g., transmission control protocol/internet protocol (TCP/IP) sockets, remote direct memory access (RDMA) message pairs, and the like) are heavily consumed.

For example, in vSAN, a virtual disk maps to an object with multiple components for availability and performance purposes. An I/O request issued by a VM 140 (client) arrives at an owner (the I/O coordinator of this object). The owner is responsible for sending additional I/Os to the RAID tree that the object's policy maintains. This RAID tree might divide the owner level I/Os into multiple smaller sub I/Os (and even multiple batches of these with barriers in-between). The owner's sub I/Os reach the destination host, where the actual data component resides (a particular disk group 171). This is the smallest granularity of an I/O destination. Since this is a distributed system, CLIENT, OWNER, and COMPONENT are role names and could or could not be on the same host.

Distributed storage software 153 can support multiple versions of objects. One object version can have one type of file system (e.g., extent-based), and another object version can have another type of file system (log-structured). In embodiments described herein, a version vSAN1 supports an extent-based file system, and a version vSAN2 supports a log-structured file system. A log-structured file system allows for larger writes, efficient erasure coding, and is snapshot friendly. These characteristics allow for better performance and storage utilization. A log-structured file system stores all incoming writes at a new location, hence it provides good write performance for sequential and random writes. This property also facilitates replacing RAID1 disk groups with more storage efficient RAID5/6 without comprising on performance or fault tolerance level. In embodiments vSAN2 also allows for copy-on-write (COW) snapshots, which are facilitated by the log-structured file system. The read performance of COW snapshots is significantly better than a delta-based snapshot scheme, as the read operation does not traverse through a chain of snapshots to fetch the data. A user may desire to upgrade objects from vSAN1 to vSAN2 but cannot afford downtime. Techniques described herein allow for upgrading objects to use a new file system live without disrupting incoming user IO and without causing significant performance degradation.

In embodiments, host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure.

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, CA If network manager 112 is absent, virtualization management server 116 can orchestrate SD network layer 175.

Virtualization management server 116 and network manager 112 comprise a virtual infrastructure (VI) control plane 113 of virtualized computing system 100. In embodiments, network manager 112 is omitted and virtualization management server 116 handles virtual networking. Virtualization management server 116 can include VI services 108. VI services 108 include various virtualization management services, such as a distributed resource scheduler (DRS), high-availability (HA) service, single sign-on (SSO) service, virtualization management daemon, vSAN service, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, and the like.

Figure 2:
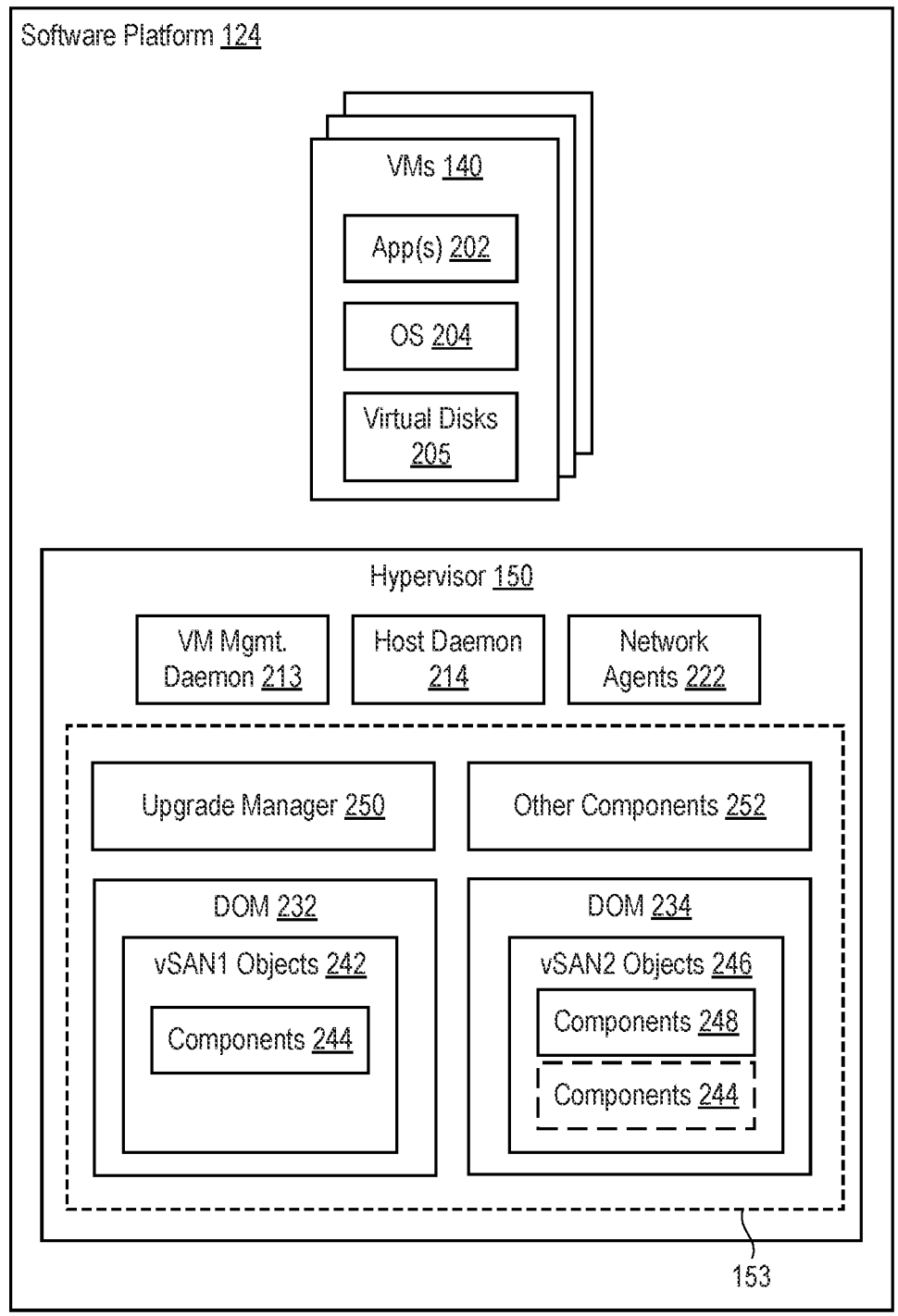
FIG. 2 is a block diagram depicting a software platform according to an embodiment.

FIG. 2 is a block diagram depicting software platform 124 according an embodiment. As described above, software platform 124 of host 120 includes hypervisor 150 that supports execution of VMs 140. In an embodiment, hypervisor 150 includes a VM management daemon 213, a host daemon 214, and distributed storage software 153. VM management daemon 213 is an agent 152 installed by virtualization management server 116. VM management daemon 213 provides an interface to host daemon 214 for virtualization management server 116. Host daemon 214 is configured to create, configure, and remove VMs (e.g., VMs 140). Network agents 222 comprises agents 152 installed by network manager 112. Network agents 222 are configured to cooperate with network manager 112 to implement logical network services. Network agents 222 configure the respective host as a transport node in a cluster 103 of transport nodes. Each VM 140 has applications 202 running therein on top of an OS 204. Each VM 140 has one or more virtual disks 205 attached thereto for data storage and retrieval.

Distributed storage software 153 includes an upgrade manager 250, a distributed object manager (DOM) 232, a DOM 234, and various other components 252. Each DOM 232, 234 is configured to receive IO requests from VMs 140, communicate with other DOMs in other hosts, and provide instructions to lower-level components for reading and writing to disk groups. In the embodiment of FIG. 2, DOM 232 manages objects in the vSAN1 format ("vSAN1 objects 242"). A vSAN1 object 242, as described herein, has component(s) 244, each of which is mapped to a disk group having an extent-based file system. DOM 234 manages objects in the vSAN2 format ("vSAN2 objects 246"). A vSAN2 object 246, as described herein, has components 248, each of which is mapped to a disk group having a log-structured file system. Upgrade manager 250 is configured to upgrade vSAN1 objects 242 to vSAN2 objects 246. During the upgrade process, a vSAN2 object 246 can include a concatenation of new components (components 248) and old component(s) (components 244). Once the upgrade is complete, a vSAN2 object 246 includes only new components (components 248).

Other components 252 can include a cluster membership, monitoring and directory services (CMMDS), a cluster-level object manager (CLOM), a local log-structured object manager (LSOM). The CMMDS provides topology and object configuration information to the CLOM and DOMs 232/234. The CMMDS selects owners of objects, inventories items (hosts, networks, devices), stores object metadata information, among other management functions. The CLOM provides functionality for creating and migrating objects that back virtual disks 205. The LSOM provides functionality for interacting with disks of disk groups 171.

Figure 3:
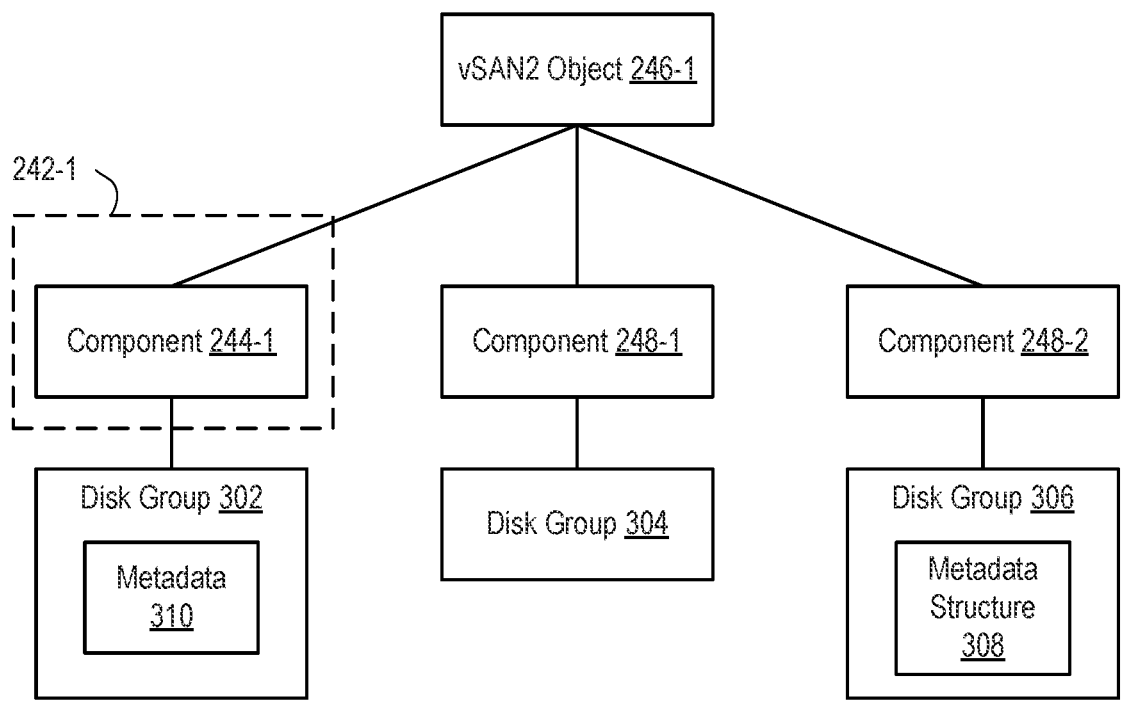
FIG. 3 is a block diagram depicting a distributed storage object according to an embodiment.

FIG. 3 is a block diagram depicting a distributed storage object according to an embodiment. A vSAN2 object 246-1 is shown during upgrade of a vSAN1 object 242-1. During the upgrade, vSAN2 object 246-1 is a concatenation of a component 244-1 of vSAN1 object 242-1 and new components 248-1 and 248-2 of vSAN2 object 246-1. Component 244-1 maps to a disk group 302 use an extent-based file system for the vSAN1 object. Component 248-1 is mapped to a disk group 304. Component 248-2 is mapped to a disk group 306. Disk groups 304 and 306 use a log-structured file system for the vSAN2 object. For example, disk group 302 may be any RAID group, such as RAID5. Component 248-1 may be a performance component and disk group 304 may be a RAID1 group of SSD devices. Component 248-2 may be a capacity component and disk group 306 may be a RAID6 group of hard disks. Those skilled in the art will appreciate that various other configurations are possible using different RAID types.

During the upgrade process, upgrade manager 250 will read data from component 244-1 and write the data to component 248-2 (the capacity component). Prior to the data copy, however, upgrade manager 250 pre-populates metadata from the vSAN1 object to the vSAN2 object. That is, upgrade manager 250 pre-populates a metadata structure 308 stored on disk group 306 with metadata 310 from disk group 302.

Figure 4:
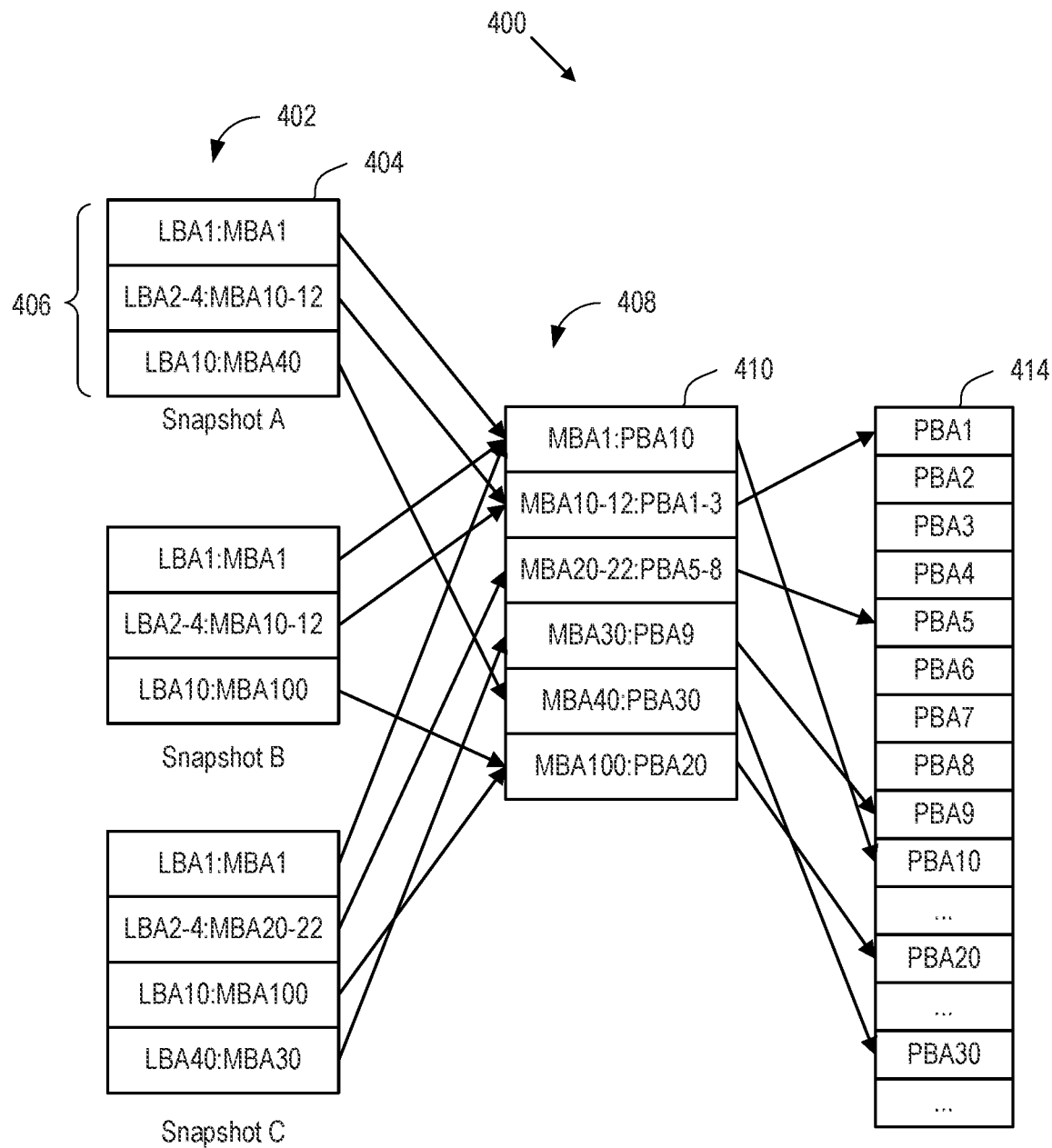
FIG. 4 is a block diagram depicting a metadata structure of a log-structured file system according to an embodiment.

FIG. 4 is a block diagram depicting a metadata structure 400 of a log-structured file system according to an embodiment. Metadata structure 400 is an example of a metadata structure stored on a disk group of a vSAN2 object, which uses a log-structured file system. One type of metadata structure includes a logical map that has entries that point to physical addresses. A log-structured file system uses write buffering. Updates to data blocks are tracked in memory and can be cached in a performance/metadata component of the storage. After a sufficient number of updates, the log-structured file system writes the updates to a capacity component of the disk group all at once as a group ("segment"). The log-structured file system stores each segment at a new location. An overwrite will render a previous write as invalid or stale. A garbage collection process identifies segments having the most invalid data and moves the valid data from such segments to a new location. This movement requires that the physical address for such data be updated in the logical map. However, this is in conflict with the COW snapshot mechanism, which mandates that data stored in shared nodes are not modified. Thus, in embodiments, vSAN2 as described herein includes a layer of indirection in the metadata structure, i.e., all entries in the logical map point to entries in a middle map, and middle map entries point to actual physical addresses. Segments can be cleaned by modifying physical addresses stored in the middle map obviating the need to modify logical map entries, avoiding violation of COW constraints.

Metadata structure 400 includes a logical map 402 having entries 404. Distributed storage software 153 can generate various COW snapshots, which are instances of logical map 402 (e.g., snapshots A, B, and C shown in FIG. 4). Each entry 404 in logical map 402 maps a logical block address (LBA) to a middle block address (MBA) of a middle map 408. Middle map 408 includes entries 410. Each entry 410 maps an MBA to a physical block address (PBA) 414. Note that some entries 404 in logical map 402 can map a single LBA to a single MBA, while other entries 404 in logical map 402 can map an extent of LBAs to an extent of MBAs. Likewise, some entries 410 in middle map 408 can map a single MBA to a single PBA, while other entries 410 in middle map 408 can map an extend of MBAs to an extent of PBAs.

Figure 5A:
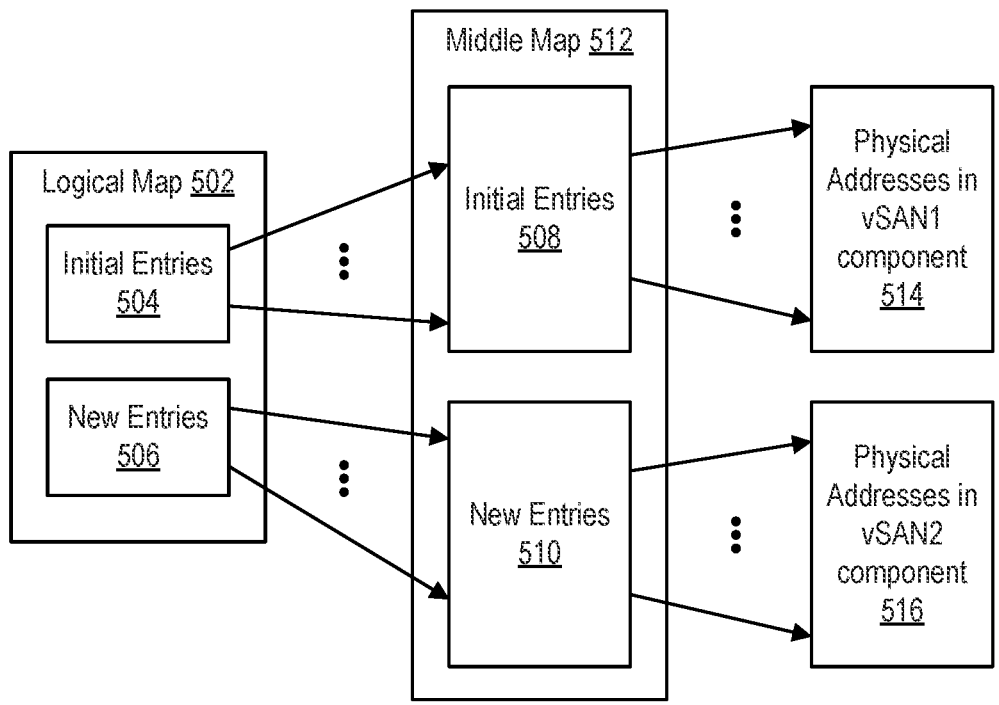
FIGS. 5A and 5B are block diagrams depicting states of a metadata structure of a log-structured file system during upgrade of a distributed storage object according to an embodiment.
Figure 5B:
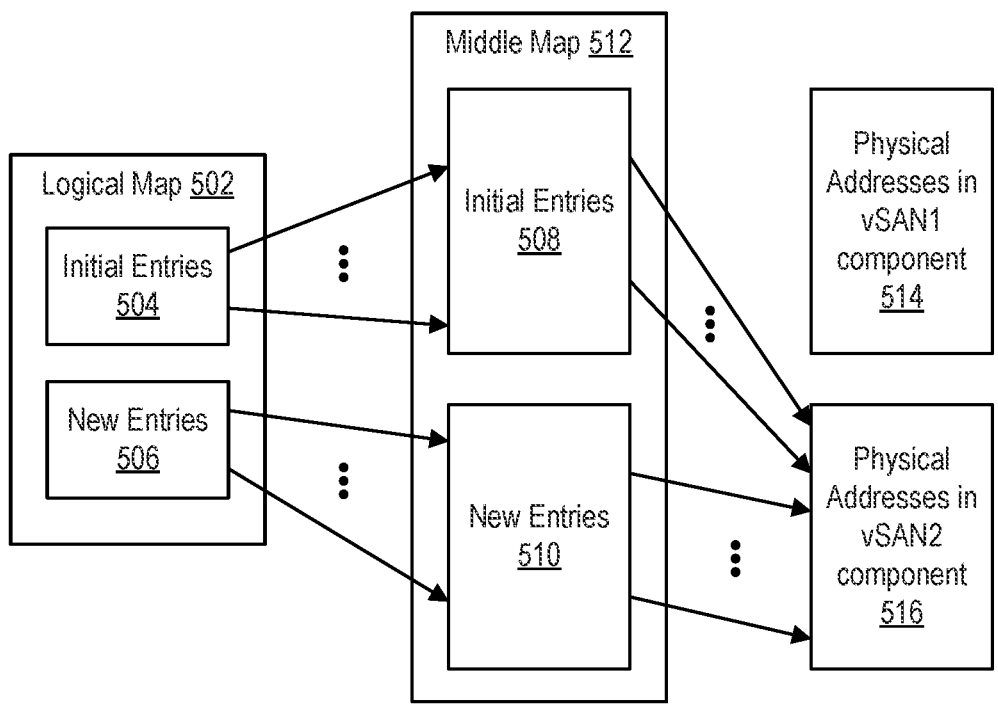
Figure 6:
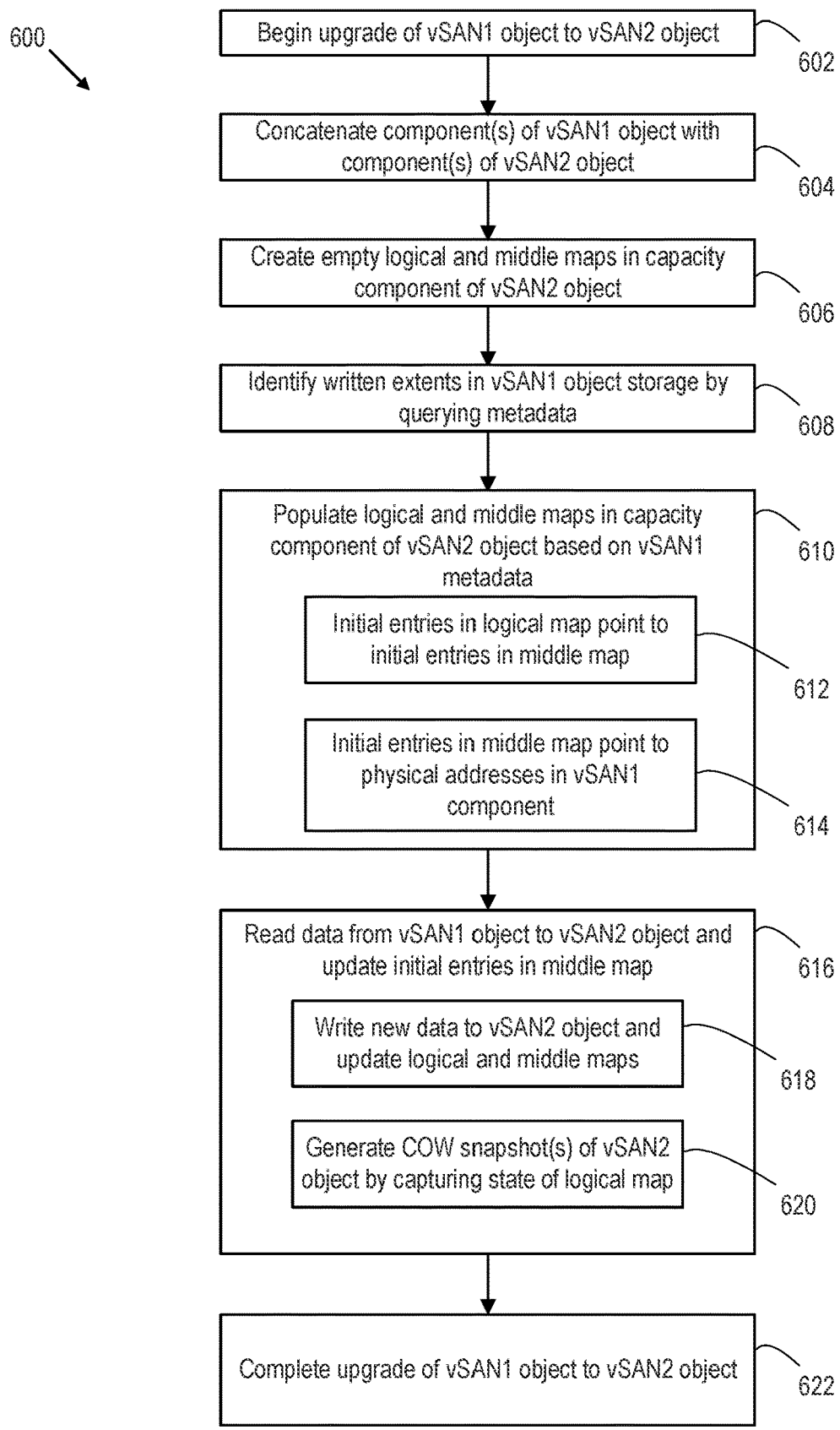
FIG. 6 is a flow diagram depicting a method of upgrading a distributed storage object according to an embodiment.

FIGS. 5A and 5B are block diagrams depicting states of a metadata structure of a log-structured file system during upgrade of a distributes storage object according to an embodiment. FIG. 6 is a flow diagram depicting a method 600 of upgrading a distributed storage object according to an embodiment. Method 600 can be understood with further reference to FIGS. 3, 5A, and 5B as described below.

Method 600 begins at step 602, where upgrade manager 250 begins an upgrade of a vSAN1 object to a vSAN2 object. The vSAN1 object is an object having a first version where the data thereof is stored using an extent-based file system on the disk group(s). The vSAN2 object is an object having a second version where the data thereof is stored using a log-structured file system on the disk group(s). At step 604, upgrade manager 250 concatenates component(s) of the vSAN1 object with component(s) of the vSAN2 object. An example is shown in FIG. 3, where vSAN2 object 246-1 includes component 248-1 (performance component) and component 248-2 (capacity component) concatenated with component 244-1 (capacity component) of vSAN object 242-1.

At step 606, upgrade manager 250 creates empty logical and middle maps in the capacity component of the vSAN2 object (e.g., in metadata structure 308 of disk group 306). At step 608, upgrade manager 250 identifies written extents in the vSAN1 object storage (e.g., disk group 302) by querying the metadata thereon (e.g., metadata 310). Metadata 310 identifies the physical locations and extents of data for the vSAN1 object.

At step 610, upgrade manager 250 populates the logical and middle maps in the capacity component of the vSAN2 object based on the vSAN1 metadata. At step 612, initial entries 504 in logical map 502 point to initial entries 508 in middle map 512. At step 614, initial entries 508 in middle map 512 point to physical addresses 514 in the vSAN1 component (e.g., physical address on disk group 302). During the upgrade process, as new writes are received, new entries 506 are created in logical map 502 and new entries 510 are created in middle map 512. New entries 506 point to new entries 510, and new entries 510 point to physical addresses 516 in the vSAN2 component (e.g., disk group 306). During the upgrade process, COW snapshots can be generated capturing states of initial entries 504 and new entries 506 in logical map 502.

At step 616, upgrade manager 250 reads data from the vSAN1 object and writes the data to the vSAN2 object. Upgrade manager 250 updates initial entries 508 in middle map 512 as the data is moved from the vSAN1 object to the vSAN2 object. As shown in FIG. 5B, at the end of the upgrade process, all entries (e.g., including all initial entries 508) in middle map 512 point to physical addresses 516 in the vSAN2 component (e.g., disk group 306). During step 616, DOM 234 can write new data to the vSAN2 object and update the logical and middle maps accordingly with new entries 506 and new entries 510, respectively (step 618). During step 616, DOM 234 can generate one or more COW snapshots of the vSAN2 object by capture state(s) of the logical map (step 620). At step 622, upgrade manager 205 completes upgrade of the vSAN1 object to the vSAN2 object. Since there are no more references to locations in component(s) of the vSAN1 object, the vSAN1 object can be freed and the resources reclaimed.

Another approach for upgrading a vSAN1 object is to first create an empty logical and middle map. All write operations will populate these maps similar to a fresh new vSAN2 storage object. The read path will first lookup data in the new map and if the data is not present, the read path will fetch the data from the vSAN1 storage to fulfill the read request. Meanwhile, the upgrade process moves non-overwritten data from vSAN1 to vSAN2 storage. This approach, however, prevents generation of COW snapshots until all data has been moved over. This can take a long time and any snapshot generated during this time needs to be in a format other than COW, such as delta disk format.

The upgrade technique described in FIG. 6 has several advantages. A COW snapshot can be generated during the upgrade process while data is still being moved from vSAN1 to vSAN2 storage. Further, read operations are only redirected when the middle map indicates that data is present in vSAN1 storage.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of upgrading a distributed storage object from a first version to a second version, comprising:
  querying metadata of a first component, the first component configured according to the first version of the distributed storage object, the metadata defining extents of data on a disk group of the first component;
  populating, for a second component configured according to the second version of the distributed storage object, a logical map and a middle map based on the metadata, initial entries in the logical map point to initial entries in the middle map, and the initial entries in the middle map point to physical addresses of the disk group of the first component; and reading the data from the disk group of the first component and writing the data to a disk group of the second component while updating the initial entries in the middle map.

2. The method of claim 1, wherein the second component uses a log-structured file system.

3. The method of claim 1, wherein the distributed storage object is stored on local storage devices of virtualized hosts in a cluster.

4. The method of claim 1, wherein, after all the data is read from the disk group of the first component and written to the disk group of the second component, all entries in the middle map point only to physical addresses of the disk group of the second component.

5. The method of claim 1, wherein, during the step of reading the data from the disk group of the first component and writing the data to the disk group of the second component, the method comprises:

writing new data to the disk group of the second component; and updating new entries in the logical map to point to new entries in the middle map, the new entries in the middle map pointing to physical addresses of the disk group in the second component.

6. The method of claim 1, wherein, during the step of reading the data from the disk group of the first component and writing the data to the disk group of the second component, the method comprises:

generating a copy-on-write (COW) snapshot of the distributed storage object by capturing a state of the logical map.

7. The method of claim 1, wherein, prior to the step of querying, the method comprises:

concatenating the first component and the second component as part of the distributed storage object; and creating empty versions of the logical map and the middle map in the second component.

8. A non-transitory computer readable medium comprising instructions to be executed in a computing device to cause the computing device to carry out a method of upgrading a distributed storage object from a first version to a second version, comprising:

querying metadata of a first component, the first component configured according to the first version of the distributed storage object, the metadata defining extents of data on a disk group of the first component;

populating, for a second component configured according to the second version of the distributed storage object, a logical map and a middle map based on the metadata, initial entries in the logical map point to initial entries in the middle map, and the initial entries in the middle map point to physical addresses of the disk group of the first component; and reading the data from the disk group of the first component and writing the data to a disk group of the second component while updating the initial entries in the middle map.

9. The non-transitory computer readable medium of claim 8, wherein the second component uses a log-structured file system.

10. The non-transitory computer readable medium of claim 8, wherein the distributed storage object is stored on local storage devices of virtualized hosts in a cluster.

11. The non-transitory computer readable medium of claim 8, wherein, after all the data is read from the disk group of the first component and written to the disk group of the second component, all entries in the middle map point only to physical addresses of the disk group of the second component.

12. The non-transitory computer readable medium of claim 8, wherein, during the step of reading the data from the disk group of the first component and writing the data to the disk group of the second component, the method comprises:

writing new data to the disk group of the second component; and updating new entries in the logical map to point to new entries in the middle map, the new entries in the middle map pointing to physical addresses of the disk group in the second component.

13. The non-transitory computer readable medium of claim 8, wherein, during the step of reading the data from the disk group of the first component and writing the data to the disk group of the second component, the method comprises:

generating a copy-on-write (COW) snapshot of the distributed storage object by capturing a state of the logical map.

14. The non-transitory computer readable medium of claim 8, wherein, prior to the step of querying, the method comprises:

concatenating the first component and the second component as part of the distributed storage object; and creating empty versions of the logical map and the middle map in the second component.

15. A virtualized computing system having a cluster comprising hosts connected to a network, the virtualized computing system comprising:

hardware platforms of the hosts configured to execute software platforms including distributed storage software;

shared storage comprising local storage devices of the hardware platforms, the shared storage storing a distributed storage object managed by the distributed storage software;

an upgrade manager of the distributed storage software configured to upgrade the distributed storage object from a first version to a second version by:

querying metadata of a first component, the first component configured according to the first version of the distributed storage object, the metadata defining extents of data on a disk group of the first component;

populating, for a second component configured according to the second version of the distributed storage object, a logical map and a middle map based on the metadata, initial entries in the logical map point to initial entries in the middle map, and the initial entries in the middle map point to physical addresses of the disk group of the first component; and reading the data from the disk group of the first component and writing the data to a disk group of the second component while updating the initial entries in the middle map.

16. The virtualized computing system of claim 15, wherein the second component uses a log-structured file system.

17. The virtualized computing system of claim 15, wherein, after all the data is read from the disk group of the first component and written to the disk group of the second component, all entries in the middle map point only to physical addresses of the disk group of the second component.

18. The virtualized computing system of claim 15, wherein, during the reading of the data from the disk group of the first component and the writing of the data to the disk group of the second component, the upgrade manager is configured to:
   write new data to the disk group of the second component; and
   update new entries in the logical map to point to new entries in the middle map, the new entries in the middle map pointing to physical addresses of the disk group in the second component.

19. The virtualized computing system of claim 15, wherein, during the reading of the data from the disk group of the first component and the writing of the data to the disk group of the second component, the upgrade manager is configured to:
   generate a copy-on-write (COW) snapshot of the distributed storage object by capturing a state of the logical map.

20. The virtualized computing system of claim 15, wherein prior to querying the metadata, the upgrade manager is configured to:
   concatenate the first component and the second component as part of the distributed storage object; and
   create empty versions of the logical map and the middle map in the second component.

\* \* \* \* \*